United States Patent [19]

Tsuji

[11] Patent Number: 5,051,833
[45] Date of Patent: Sep. 24, 1991

[54] CAMERA APPARATUS CAPABLE OF FREELY SETTING OBJECTIVE AREA WITHIN VIEWED SUBJECT

[75] Inventor: Akio Tsuji, Akishima, Japan

[73] Assignee: Casio Computer Co., Ltd., Tokyo, Japan

[21] Appl. No.: 510,962

[22] Filed: Apr. 19, 1990

[30] Foreign Application Priority Data

Apr. 28, 1989 [JP] Japan ................................. 1-110111
May 9, 1989 [JP] Japan ................................. 1-115484

[51] Int. Cl.⁵ .......................................... H04N 5/232
[52] U.S. Cl. ................................... 358/227; 358/228; 358/209; 358/213.19; 358/213.13
[58] Field of Search .............. 358/227, 228, 209, 55, 358/224, 213.19, 213.13

[56] References Cited

U.S. PATENT DOCUMENTS 4,837,633  6/1989  Parra ................................. 358/224
4,872,058 10/1989  Baba et al. ....................... 358/227
4,873,576 10/1989  Hattori et al. .................... 358/224
4,945,424  7/1990  Hiroki et al. ..................... 358/224
4,969,044 11/1990  Hijikata et al. .................. 358/227
4,969,045 11/1990  Haruki et al. .................... 358/228

Primary Examiner—James J. Groody
Assistant Examiner—Tuan V. Ho
Attorney, Agent, or Firm—Frishauf, Holtz, Goodman & Woodward

[57] ABSTRACT

In an electronic still camera employing a CCD, an automatic exposure control and an automatic focusing control are carried out by utilizing an image signal derived from CCD to photograph a subject. A liquid crystal display unit is provided within a viewfinder. A designation is performed on a subject image to be automatically controlled for the exposure and focusing operations by utilizing a frame displayed on the liquid crystal display unit. The automatic exposure control and automatic focusing control are executed with respect to the subject positioned within the frame displayed on the liquid crystal display unit.

13 Claims, 10 Drawing Sheets

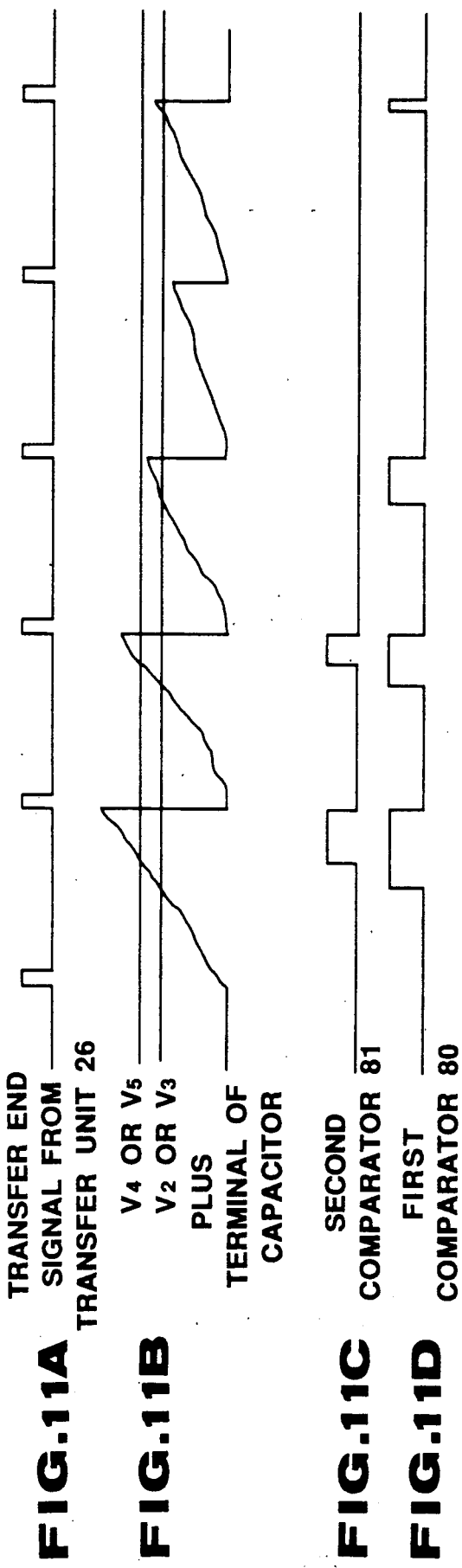

CAMERA APPARATUS CAPABLE OF FREELY SETTING OBJECTIVE AREA WITHIN VIEWED SUBJECT

BACKGROUND OF THE INVENTION

1. Field of the Invention

The present invention relates to a camera apparatus equipped with an automatic focusing control function, and/or an automatic exposure control function.

2. Description of the Related Art

Recently, most of the camera apparatuses are equipped with either an automatic focusing control function, or an automatic exposure control function, or with both functions.

In such an automatic focusing control function, a focusing area is defined at a central part within a viewfinder, and then a focusing control is performed with respect to a viewed subject within this focusing area.

Furthermore, a so-called "focusing lock function" is provided with the automatic focusing control function. In accordance with the focusing lock function, a photograph focused on a subject which should be focused can be obtained even if this subject is not positioned within the focusing area while viewing the image through the viewfinder.

That is, this focusing lock function is performed as follows. Even when a change occurs in the once focused subject positioned within the focusing area, the lens position set to obtain the focused subject is locked without performing a further focusing function. In general, the focusing lock function is operable when the release switch is held under such a condition that this switch is depressed over a half travel length thereof, or the focusing lock switch is depressed.

In, on the other hand, the automatic exposure control function, the light quantity of the entire subject is generally measured so as to perform the exposure control.

When the focusing lock function is not equipped with the camera apparatus, the subject to be focused must be continuously positioned on the center of the viewfinder in order to perform the above-described automatic focusing control function, since the focusing area is fixed. Accordingly, such a camera apparatus has a drawback that a freedom on designation of an image is restricted. Furthermore, even if the automatic focusing control function is performed in conjunction with the focusing lock function, cumbersome operations are required, resulting in the incorrect operation of the camera apparatus. Also, in a still camera, there is another drawback that a lengthy photographing operation is required.

Furthermore, the above-described conventional automatic exposure control function has the following drawbacks. That is, in case that a dark portion and a light portion, the luminance of which is extremely different from that of the dark portion, are present within an overall subject to be photographed, the exposure control is executed based upon an average value of the respective luminance. As a consequence, the resultant image has different luminance from the respective luminance of both the dark and light portions. In particular, the above-described problem is emphasized when an image requiring the optimum luminance is positioned at either the dark portion, or the light portion.

SUMMARY OF THE INVENTION

The present invention has been made in an attempt to solve the above-described problems of the conventional camera apparatuses equipped with the automatic focusing function and/or automatic exposure function, and therefore, has an object to provide a camera apparatus capable of obtaining a subject image to be focused, or exposure-measured, from an arbitrary portion within the subject which is being observed through a viewfinder, while performing, for instance, the automatic focusing control function, or the automatic exposure control function.

To achieve the above-described object, a camera apparatus according to the present invention comprises:

optical image forming means for forming an optical image;

image sensing means having a photoelectric converting area comprised of a plurality of frame areas, for producing electric signals in response to said optical image formed by said optical image forming means;

area designating means for designating a desired frame area from said plurality of frame areas;

selecting means for selecting from the electric signals produced by the whole electric converting area, electric signals produced by said desired frame area designated by said area designated means; and, producing means for producing a video signal based on said electric signals produced by said image sensing means and said selecting means.

In accordance with the camera apparatus of the present invention with the above-described arrangements, the operational capabilities for performing automatic focusing control and also automatic exposure control can be improved, and furthermore the desirable images can be acquired irrespective of the designation of the subject, and the conditions of the luminance of the subject.

BRIEF DESCRIPTION OF THE DRAWINGS

The above-described aspects and other features of the present invention are explained in the following description, taken in connection with the accompanying drawings, in which.

DETAILED DESCRIPTION OF THE PREFERRED EMBODIMENTS

GENERAL ARRANGEMENT OF ELECTRONIC STILL CAMERA

Figure 1:
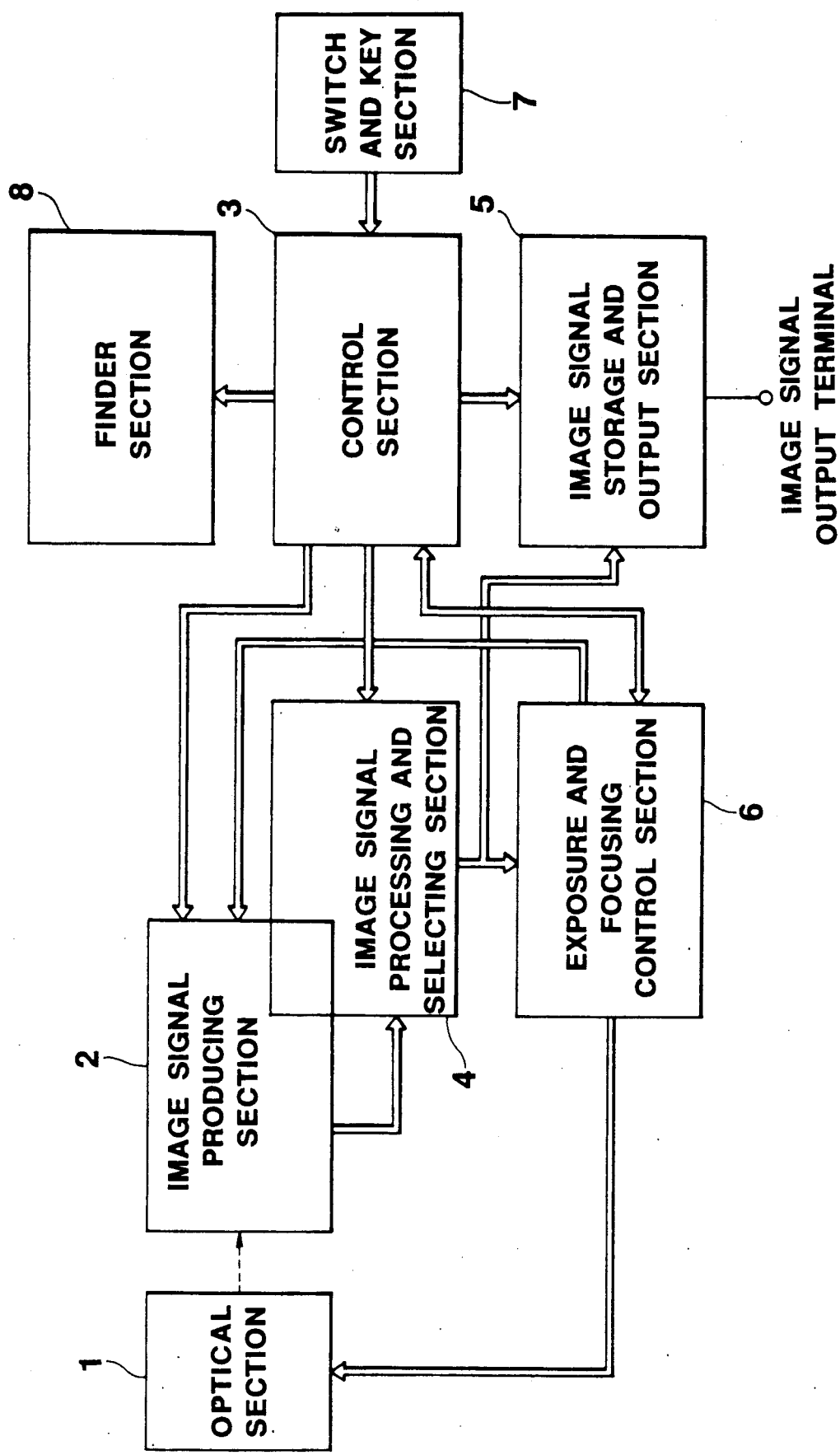
FIG. 1 is a schematic block diagram of a general arrangement of an electronic still camera according to a first preferred embodiment of the invention.

Referring now to FIG. 1, an overall arrangement of an electronic still camera according to a first preferred embodiment of the present invention will be described in detail.

In the first electronic still camera shown in FIG. 1, an optical section 1 is employed so as to focus an image of an object (not shown in detail) being photograph with a desirable light level onto a predetermined plane of an image signal producing section 2. Under the control of a control section 3, the image signal producing section 2 produces an electronic still image signal in response to the object image focused by the optical section 1. Then, the electronic still image signal produced by the image signal producing section 2 is supplied to an image signal processing and selecting section 4.

The function of the image signal producing and selecting section 4 is to produce both a luminance signal and a color difference signal based on the electronic still image signal derived from the image signal producing section 2. Furthermore, the luminance signal is supplied from this image signal processing and selecting section 4 to both an image signal storage and output section 5, and an exposure and focusing control section 6, whereas the color difference signal is furnished therefrom to the image signal storage and output section 5. The image signal processing and selecting section 4 selects the luminance signal to be supplied to the exposure and focusing control section 6 in conjunction with the image signal producing section 2. That is, both the image signal processing and selecting section 4 and image signal producing section 2 produce a luminance signal with respect to an electronic image signal constituting a portion within a photographing range which is designated by a switch and key section 7, under the control of the control section 3, and thereafter supplies this selected luminance signal to the exposure and focusing control section 6.

The function of the above-described image signal storage and output section 5 is to store therein both the luminance signal and color difference signal supplied from the image signal processing and selecting section, and also to produce a color television signal, for instance, the NTSC (National Television System Committe) color TV signal in response to these luminance and color difference signals, which will be then furnished to an image signal output terminal.

Furthermore, the function of the exposure and focusing control section 6 is to detect an on-focusing condition of the object image focused by the optical section 1 based upon the luminance signal supplied from the image signal processing and selecting section 4, and to control the optical section 1 in such a manner that the above-described on-focusing condition of the object under imaging can be achieved. Moreover, this exposure and focusing control section 6 senses the light quantity of the object via the optical section 1, and controls both the optical section 1 and image signal producing section 2 in response to the sensed light quantity in such a way that the object image is converted into the electronic still image signal with a proper exposure level.

The switch and key section 7 outputs to the control section 3, an instruction signal for instructing a commencement of a photographing/recording process, instruction signals for instructing commencement of an exposure control process and a focusing control process, and an instruction signal for instructing an output of the recorded image signal. This switch and key section 7 further outputs a switching signal for switching an entire photometric mode and a spot photometric mode in connection with an exposure/focusing control during the photographing mode, and also a designation signal for designating a photometric region during the spot photometric mode.

In the arrangement of the electronic still camera shown in FIG. 1, a finder section 8 is provided, which is so constructed that the image of the object under photograph within the range focused by the optical section 1 can be observed, and also a photometric region designated by the switch and key section 7 can be indicated.

PARTICULAR ARRANGEMENT OF ELECTRONIC STILL CAMERA

A detailed arrangement of the respective sections shown in FIG. 1 will now be described with reference to FIG. 2.

First, the optical section 1 is constructed of an optical block 11, a lens driving block 12 and a diaphragm drive block 13.

The optical block 11 is provided to obtain the optical image of the object being photographed, and is arranged by lenses 14 and 15 and a diaphragm 16.

Then, the lens driving block 12 is constructed of a lens driving motor 17 and a motor drive control unit 18. The lens driving block 12 drives the lens 14 of the optical block 11 under the control of the exposure and focusing control unit 6.

The diaphragm drive block 13 is constituted by a diaphragm drive motor 19 and a motor drive control unit 20, and opens/closes the diaphragm 16 employed in the optical block 11 under the control of the exposure and focusing control unit 6. The optical image of the subject is focused by the optical block 11 on a predetermined position of the image signal producing section 2 at which an image sensor 21 constructed of a solid-state imaging element (CCD and the like) is provided. The image sensor 21 is, for instance, an area sensor having 380,000 picture elements (pixels). Color filters (not shown in detail) are provided on the light receiving plane of this area sensor from which an electric color image signal can be obtained. Then, the above-described image sensor 21 outputs an electric image signal corresponding to an optical image of the subject which has been formed by the optical block 11 under the control of an H driver 22 and a V driver 23.

Both the H driver 22 and V driver 23 control the operations of the sensor 21 based on the exposure time data stored in the exposure time data memory unit 25 under the control of the control unit 24 (control section 2). It should be noted that the above-described sensor 21, H driver 22, V driver 23, transfer control unit 26 and exposure time data memory unit 25 constitute the image signal producing section 2 shown in FIG. 1.

DETAILED ARRANGEMENT OF IMAGE SENSOR

Figure 3:
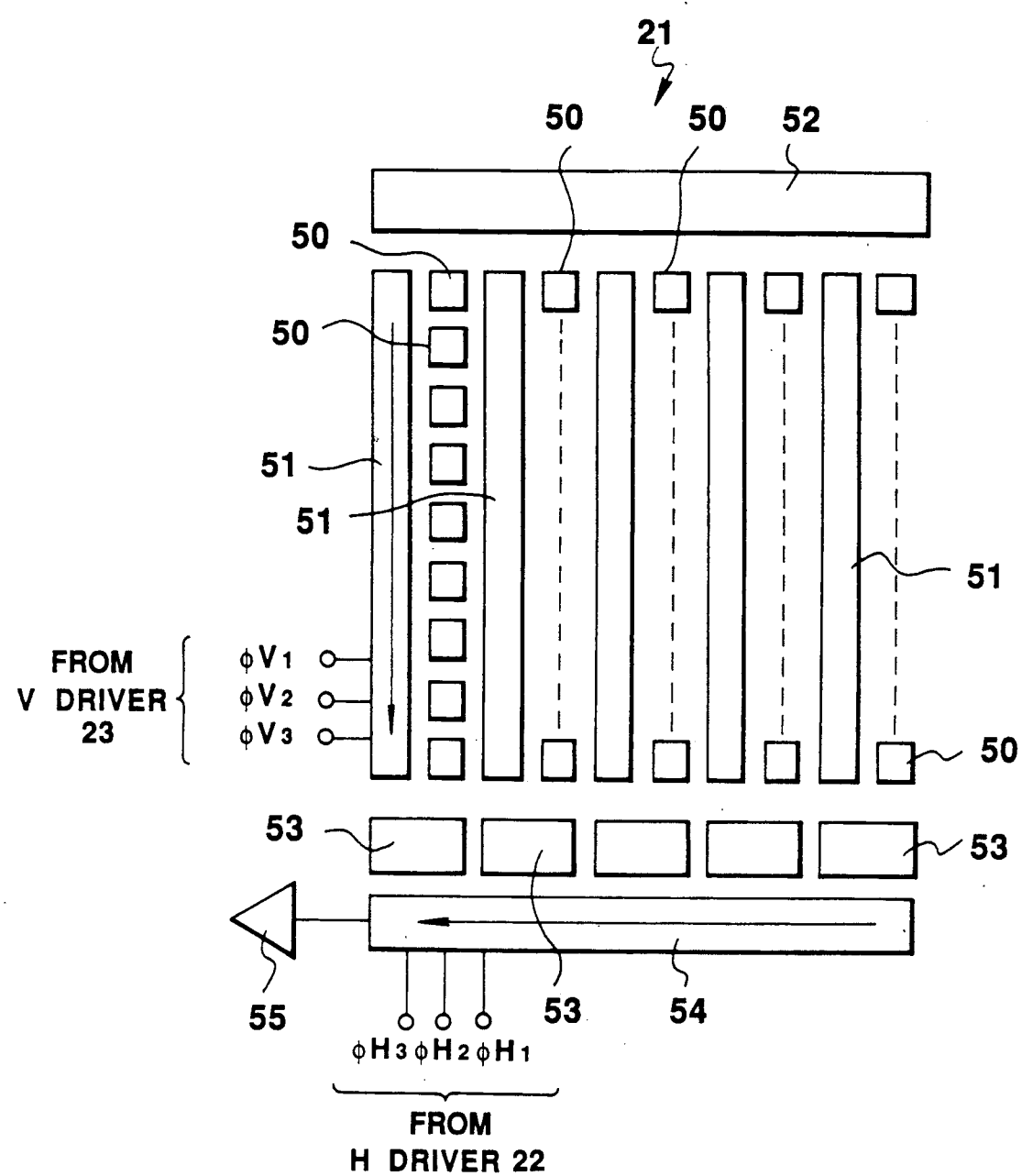
FIG. 3 is a schematic diagram of a detailed arrangement of an image sensor shown in FIG. 2.

In FIG. 3, there is shown a detailed arrangement of the above-described image sensor 21.

In this image sensor 21, a plurality of photoelectric converting units (i.e., pixels) 50 are arranged along both a vertical direction and a horizontal direction. Vertical transfer units 51 are provided with each row of the vertical photoelectric converting unit 50. Vertical transfer clocks $\phi_{V1}$, $\phi_{V2}$, and $\phi_{V3}$ are supplied from the V driver 23 to the vertical transfer unit 51 so that charges produced by the photoelectric converting unit 50 are transferred in response to these vertical transfer clocks $\phi_{V1}$, $\phi_{V2}$, and $\phi_{V3}$. It should be noted that in this vertical transfer unit 51, the transfer directions of the charges obtained by the photoelectric converting unit 50 are changed in accordance with the output sequence of the vertical transfer clocks $\phi_{V1}$, $\phi_{V2}$, and $\phi_{V3}$.

A drain 52 is provided above the vertical transfer unit 51. The drain 52 drains out the charges transferred from the vertical transfer unit 51.

Under the vertical transfer unit 51, an accumulating unit 53 is formed. The function of this accumulating unit 53 is to temporarily store the charges transferred from the vertical transfer unit 51.

A horizontal transfer unit 54 is provided under this accumulating unit 53. Horizontal transfer clocks $\phi_{H1}$, $\phi_{H2}$, and $\phi_{H3}$ are supplied from the H driver 22 to the horizontal transfer unit 54. In response to the horizontal transfer clocks $\phi_{H1}$, $\phi_{H2}$, and $\phi_{H3}$, this horizontal transfer unit 54 transfers the charges which are supplied from the vertical transfer unit 51 via the accumulating unit 53.

Then, the charges transferred from the horizontal transfer unit 54 are output via an amplifier 55 to an external circuit.

When the image signal is acquired, the image sensor 15 with the above-described arrangements performs an interline transfer in response to the transfer clocks $\phi_{V1}$, $\phi_{V2}$, $\phi_{V3}$, $\phi_{H1}$, $\phi_{H2}$, and $\phi_{H3}$ which are supplied from the V driver 17 and H driver 16, respectively, and on the other hand, drains out the charges obtained by the photoelectric converting unit 50 to the drain 53 when the vertical transfer clocks $\phi_{V1}$, $\phi_{V2}$, and $\phi_{V3}$ are supplied in accordance with a supply sequence opposite to that of the above operation.

It should be noted that the above-described image sensor 21 or an equivalent element may be constructed by employing, for instance, the charge-coupled device type TC-245 of Texas Instruments Inc.

Figure 2:
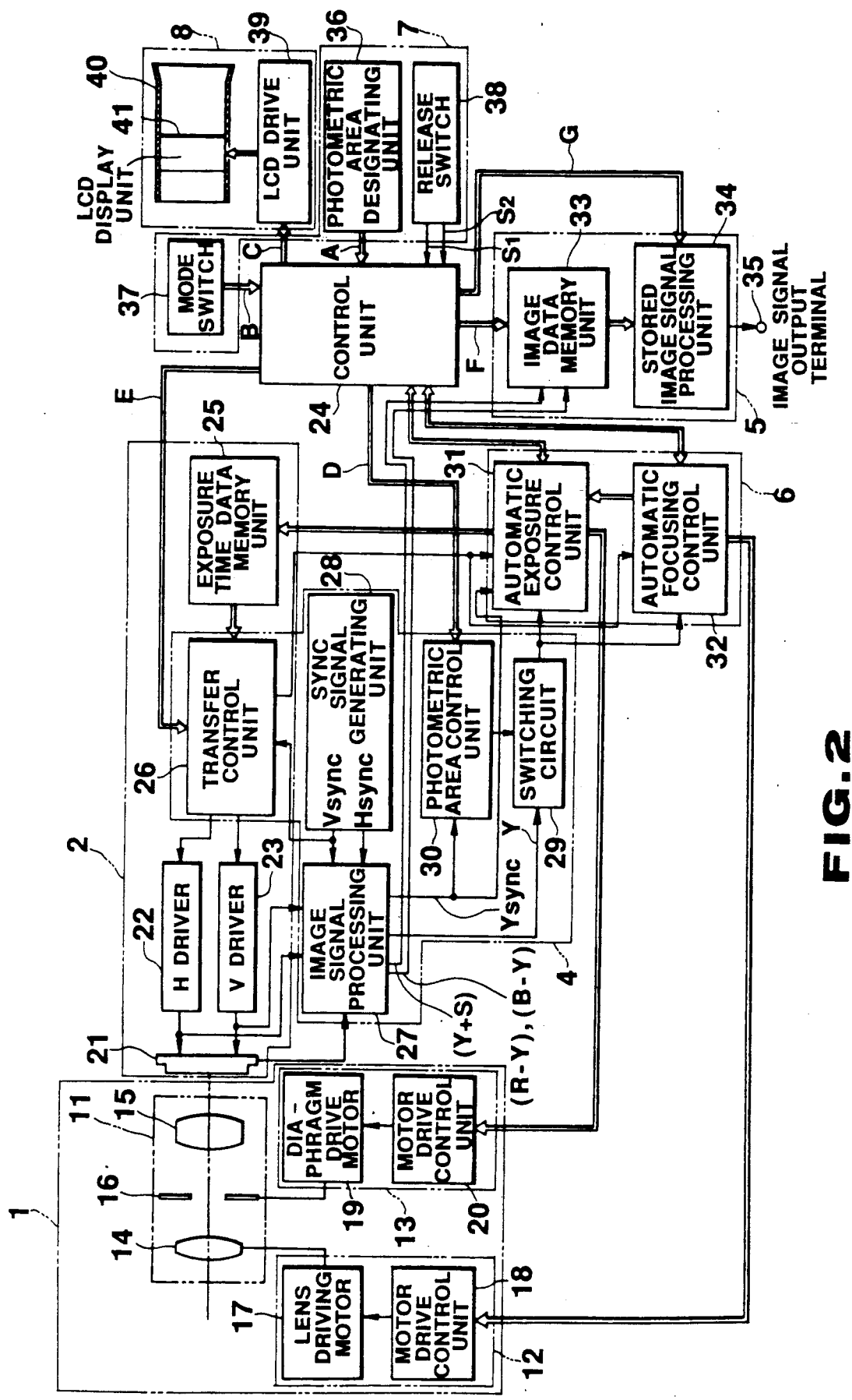
FIG. 2 is a schematic block diagram of a detailed arrangement of the electronic still camera shown in FIG. 1.

The image signal output from the image sensor 21 is supplied to an image signal process circuit 27 of the image signal processing and selecting section 4, as represented in FIG. 2.

The above-described image signal processing and selecting section 4 includes a sync signal generating unit 28, a switching circuit 29, and a photometric area control unit 30 in addition of the above-mentioned image signal process circuit 27, and further includes the transfer control unit 26. To the image signal process circuit 27, the above-described transfer clocks from the H driver 22 and V driver 23, and also a vertical sync signal Vsync and a horizontal sync signal Hsync from the sync signal generating unit 28 are supplied. The image signal processing unit 27 fetches the image signal supplied from the image sensor 21 in synchronism with the transfer clocks from the H driver 22 and V driver 23, and produces a luminance signal Y from the image signal and also a luminance/sync signal (Y+S) and color difference signals (R−Y), (B−Y) by adding the vertical sync signal Vsync and horizontal sync signal Hsync to this luminance signal Y. The image signal processing circuit 27 outputs the luminance signal Y via the switching circuit 29 to an automatic exposure control unit 31 and an automatic focusing control unit 32 of the exposure and focusing control section 6, and further outputs both the luminance/sync signal (Y+S), and color difference signals (R−Y), (B−Y) to an image data memory unit 33 of the image signal storage and output section 5. In addition, the above-described image signal processing unit 27 supplies the sync signal Ysync corresponding to the output of the luminance signal Y to the photometric area control unit 30 and the automatic exposure control unit 31.

Figure 4:
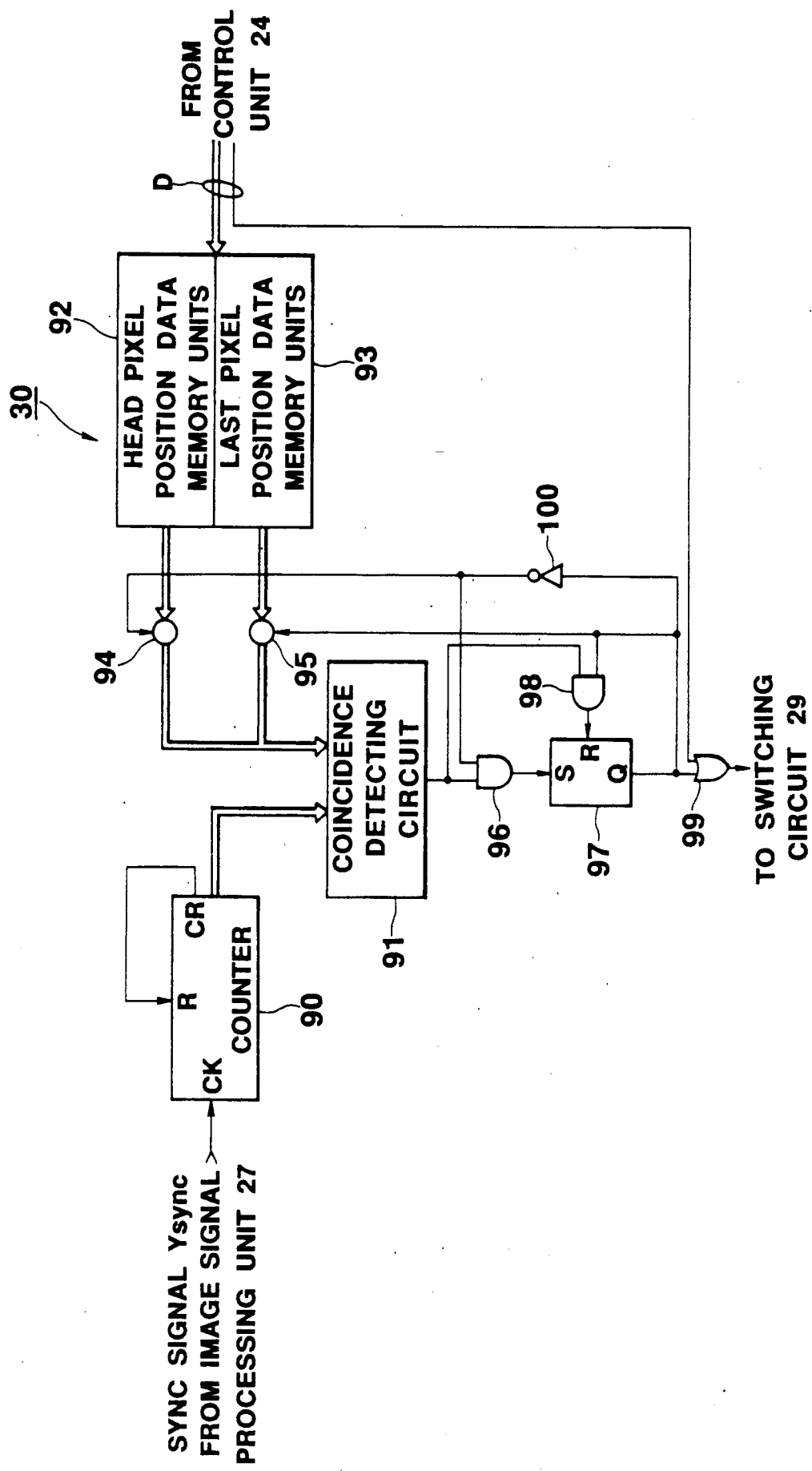
FIG. 4 is a schematic block diagram of a detailed arrangement of a photometric area control unit represented in FIG. 2.

The photometric area control unit 30 controls the switching operation of the switch circuit 39 under the control of the control unit 24, and is so arranged as shown in FIG. 4.

In FIG. 4, a counter 90 is employed to perform a counting operation in response to the sync signal Ysync of the luminance signal Y outputted from the image signal processing unit 27. When the counter 90 counts a quantity of sync signal Ysync outputted from the image signal processing unit 27 until all of the luminance signals Y corresponding to the pixels along 1 horizontal scanning period of the image sensor 1 have been outputted therefrom, a carry signal is outputted and is supplied to the counter 90 for reset operations. Then, the count value of this counter 90 is supplied to a coincidence detecting circuit 91.

Furthermore, there are provided a head pixel position data memory unit 92 and a last pixel position data memory unit 93. The head pixel position data memory unit 92 stores data on a head pixel position of a photometric area in the horizontal scanning direction which is outputted from the control unit 24 in accordance with the photometric area designated by the switch and key section 7, whereas the last pixel position data memory unit 93 stores therein data on a last pixel position of the above-described photometric area. The memory data stored in the pixel position data memory units 92 and 93 are supplied via corresponding gate circuits 94 and 95 to the coincidence detecting circuit 91.

On the other hand, when there is a coincidence between the count value derived from the counter 90 and the pixel position data read out from either the head pixel position data memory unit 92, or the last pixel position data memory unit 93, the coincidence detecting circuit 91 outputs a coincidence detecting signal. The coincidence detecting signal outputted from the coincidence detecting circuit 91 is supplied via either a set terminal S of a flip-flop 97, or an AND gate 98 to a reset terminal R of the flip-flop 97. Then, a set output Q of the flip-flop 97 is furnished via an OR gate 99 to a switching circuit 29, and to an AND gate 98 and also a gate circuit 95. Further, this set output Q is supplied via an inverter 100 to the AND gate 96 and gate circuit 94. To this OR gate 99, the overall photometric mode signal designated by the switch and key section 7 in the overall photometric mode is supplied from the control unit 24.

In the photometric area control unit 30 with the above-described circuit arrangement, first, both the count value of the counter 90 and the pixel position data of the head pixel position memory unit 92 are supplied to the coincidence detecting circuit 91. When there exists a coincidence between the count value and pixel position data, the flip-flop 97 is set to close the switching circuit 29. At the same time, in response to the set output Q from the flip-flop 97, the gate circuit 95 is closed and the pixel position data from the last pixel position data memory unit 93 is supplied to the coincidence circuit 91. Then, when the coincidence is again detected in the coincidence detecting circuit 91, the flip-flop 97 is caused to be reset so that the switching circuit 29 is closed.

Now, the operations of the exposure and focusing control section 6 will be described.

The exposure and focusing control section 6 is constructed of an automatic exposure control unit 31 and an automatic focusing control unit 32.

The functions of the automatic exposure control unit 31 are to obtain exposure time data, an open degree of the diaphragm 16, and open degree control data for controlling this open degree in response to the luminance signal Y which has been supplied via the switching circuit 29 under the control of a control unit 24.

AUTOMATIC EXPOSURE CONTROL UNIT

Figure 5:
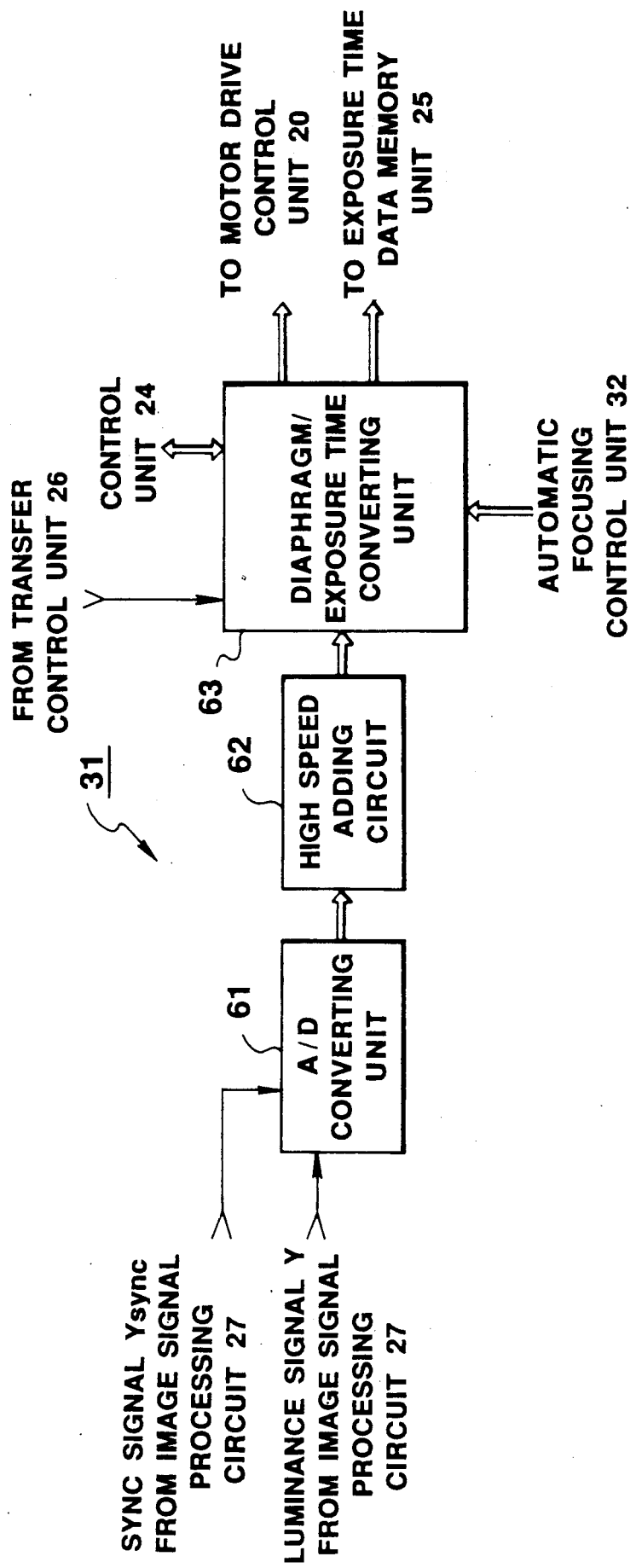
FIG. 5 is a schematic block diagram of a detailed arrangement of an automatic exposure control unit represented in FIG. 2.

FIG. 5 represents a detailed arrangement of the above-described automatic exposure control unit 31. This automatic exposure control unit 31 is constructed of an A/D converting unit 61, a high speed adding circuit 62, and a diaphragm/time converting circuit 63.

The A/D converting circuit 61 has such a function that the luminance signal Y supplied via the switching circuit 29 from the image signal processing circuit 27 is sequentially converted into digital data corresponding to the value of this luminance signal Y in synchronism with the sync signal supplied from the image signal processing circuit 27. Thus, the digital data obtained from the A/D converting unit 61 is sequentially supplied to the high speed adding circuit 62 so as to be added to each other. Furthermore, the addition data obtained from the high speed adding circuit 62 is fetched into the diaphragm/exposure time converting circuit 63 in synchronism with a transfer end signal output from a transfer control unit 26.

The diaphragm/exposure time converting unit 63 includes a table (not shown) from which a proper open degree of the diaphragm 16 and a proper exposure time based upon the addition data of the high speed adding circuit 62 which are obtained by adding all of the luminance signals supplied via the switching circuit 29 thereto, and data on the distance between the subject and the electronic still camera, which are supplied from the automatic focusing control unit 32.

Then, the diaphragm/exposure time converting unit 63 supplies the exposure time data to the exposure time data memory unit 25, and also furnishes the diaphragm open degree control data to the motor drive control unit 20 for controlling a diaphragm drive motor 19 to vary the open degree of the diaphragm 16, based upon either the data obtained from the table, or the control data supplied from the control unit 24.

Referring again back to the automatic focusing control unit 32 shown in FIG. 2 detects an on-focusing condition of an image of a subject in response to the luminance signal Y supplied via the switching circuit 29 from the image signal processing circuit 27 so as to supply a control signal to the motor control unit 18 for controlling the lens drive motor 17 by which the positions of the lens 14 is varied. It should be noted that the above-described automatic focusing control unit 32 commences the detecting operation of the on-focusing condition in synchronism with a transfer control unit 26. For instance, the automatic focusing control unit 32 detects the differences in the luminance between the respective pixels based upon the luminance signals in order to detect the on-focusing condition of the subject. The automatic focusing control unit 32 acquires data on the distance between the subject and camera based upon the position of the lens 14 when the on-focusing condition of the subject is just detected, and thereafter furnishes this data to the automatic exposure control unit 31.

Then, the above-described image signal storage and output section 5 will now be described as follows. This image signal storage and output section 5 is arranged by the above-mentioned data memory unit 33 and stored image signal processing unit 34.

The function of the image data memory unit 33 is to perform a predetermined process to both the luminance/sync signal (Y+S) and the color difference signals (R−Y), (B−Y) supplied from the image signal processing circuit 27, and thereafter to store the processed signals into a preselected memory medium. In case that, for instance, the luminance/sync signal (Y+S) and color difference signals (R−Y), (B−Y) are recorded on a video floppy disk, the luminance/sync signal (Y+S) is sequentially superimposed with the color difference signals (R−Y), (B−Y), whereby the recording process is performed.

The image data memory unit 33 supplies both the luminance/sync signal (Y+S) and color difference signals (R−Y), (B−Y) which have been stored in the recording medium to the stored image signal processing unit 34.

Then, this stored image signal processing unit 34 produces, for instance, an NTSC (National Television System Committee) color signal based on the luminance/sync signal (Y+S) and color difference signals (R−Y), (B−Y) supplied from the image data memory unit 23, and thereafter outputs the color signal to an image signal output terminal 35.

To the control unit 24, predetermined signals A, B, $S_1$ and $S_2$ are supplied from the switch and key section 7 which provide a photometric area designation unit 36, mode switch 37, and release switch 38.

The photometric area designation unit 36 is constructed of, for example, keys for designating upper, lower, right, and left directions, and supplies signals in response to the key operations to the control unit 24.

The control unit 24 outputs display control signal C to an LCD (liquid crystal diode) drive unit 35 based upon the signal A supplied from the photometric area designation unit 36.

Figure 6:
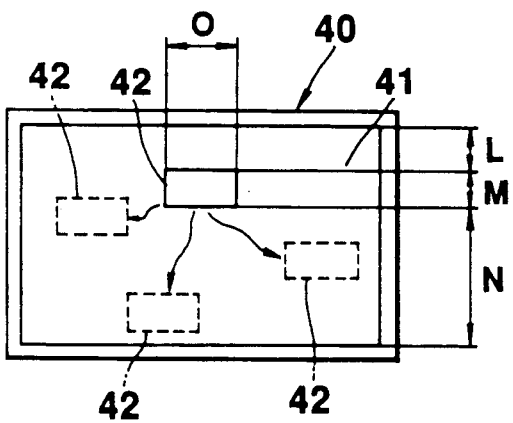
FIG. 6 represents display conditions of a liquid crystal display unit employed within the viewfinder shown in FIG. 2.

As illustrated in FIG. 6, the LCD drive unit 39 displays a designation frame 42 at a position in the LCD display unit 41 provided within a viewfinder 40. This position corresponds to the operation of the photometric area designation unit 36. The portion of the LCD display unit 41 except for the portion displayed by the designation frame 42 is transparent, through which the subject can be observed.

In response to the operation conditions of the mode switch 37 and release switch 38 (will be described later), the control unit 24 supplies to both the photometric are control unit 30 and transfer control unit 26, pixel position data and mode signals D and E corresponding to the display positions of the designation frame 42 on the LCD display unit 41 which are designated by the photometric area designation unit 36.

Then, in accordance with the pixel position data E, the transfer control unit 26 outputs only the image signal containing the subject existing in the designation frame 42 within 1 horizontal scanning period, and controls the H driver 22 and V driver 23 so as to feed out other image signals.

On the other hand, the photometric area control unit 30 controls the switching circuit 29 based upon the pixel position data D supplied from the control unit 24 and the sync signal Ysync of the luminance signal Y supplied from the image signal processing unit 27 in such a manner that only the luminance signal "Y" output from the image processing circuit 27, which contains the subject present in the designation frame 42, is supplied to the automatic exposure control unit 31 and automatic focusing control unit 32.

The functions of the mode switch 37 are to switch a recording mode and an output mode, and also charge a spot photometric mode during the automatic exposure control and an entire photometric mode, and furthermore set a manual mode and also an automatic mode of a focusing control/an exposure control.

The release switch 38 outputs a first release signal "$S_1$" when being depressed along a half traveling path thereof, and also output a second release signal "$S_2$" when being depressed over a full traveling path thereof.

Under the conditions that the recording mode is set by the mode switch 37 and further the exposure/focusing control is set to the automatic mode, the control unit 24 outputs either the control signal or control data to the automatic exposure control unit 31, automatic focusing control unit 32, photometric area control unit 30 and transfer control unit 26 in order to perform the automatic exposure/focusing control when the first release signal $S_1$ is output from the release switch 38.

That is, when the entire photometric mode is designated by the mode switch 37, the control unit 24 supplies the pixel position data D and E corresponding to the designation made by the photometric area designation unit 36 to the photometric area control unit 30 and transfer control unit 26 only when the automatic focusing control is carried out. When the automatic exposure control is carried out, the control unit 24 supplies the pixel position data D and E to the photometric area control unit 30 and transfer control unit 26 in such a way that the luminance signals Y with respect to all of the image signals obtained by the image sensor 21 are supplied to the automatic exposure control unit 31.

When the second release signal $S_2$ is output from the release switch 38 during the recording mode, the control unit 24 outputs the storing control signal F to the image data memory unit 33 so as to perform the storage process, and also outputs the transferring control signal E to the transfer control unit 26 in such a manner that the image sensor 21 produces the output signal in response to the data stored in the exposure time data memory unit 25.

In addition, when the second release signal $S_2$ is output during the output mode, the control unit 24 outputs the output control signals F and G to the image data memory unit 33 and the stored image signal processing unit 34, and outputs the image data which has been stored in the image data memory unit 33, to the image signal output terminal 35.

OPERATIONS OF ELECTRONIC STILL CAMERA

The electronic still camera with the above-described arrangements will now be described.

When the image data is recorded, the recording mode is set by operating the mode switch 37.

Furthermore, a selection is made whether or not the exposure/focusing control is set to the manual mode or automatic mode by way of the mode switch 37. In case that the automatic exposure mode is selected, another selection is made that the spot photometric mode, or entire photometric mode is chosen.

AUTOMATIC EXPOSURE CONTROL/AUTOMATIC FOCUSING CONTROL MODES

A description will now be made to such a case that the automatic exposure control/automatic focusing control modes are selected.

The designation frame 42 which is being displayed on the liquid crystal display unit 41 within the viewfinder 40, is moved to a major portion of a subject (e.g., a person who is wanted to be photographed) by the photometric area designation unit 36.

When the release switch 38 is operated so as to output the first release signal $S_1$, the automatic focusing control is first performed.

Then, the control unit 24 outputs the pixel position data D, E corresponding to the display position of the designation frame 42 which is being displayed on the liquid crystal display unit 41, to both the photometric area control unit 30 and transfer control unit 26. Thereafter, the control unit 24 outputs the control signal to the automatic exposure control unit 31.

Figure 7:
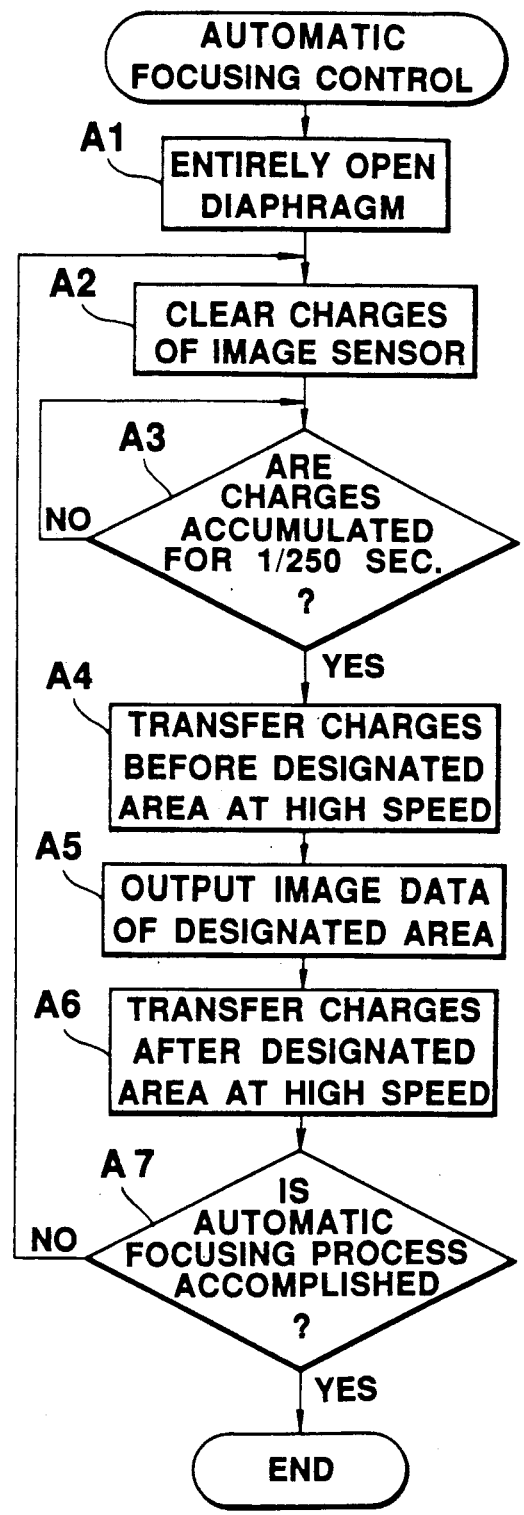
FIG. 7 is a flowchart for explaining operations of the automatic focusing control in the electronic still camera shown in FIG. 2.

As represented in a flowchart of FIG. 7, to entirely open the diaphragm 16, the automatic exposure control unit 31 outputs the control signal to the motor drive control unit 20 (step $A_1$), and also outputs predetermined exposure time data (i.e., 1/250 sec in the preferred embodiment) to the exposure time data memory unit 25.

On the other hand, the transfer control unit 26 controls the V driver 23 so as to drain out the charges accumulated in the image sensor 21 in response to the automatic exposure control starting signal E supplied from the control unit 24 (step A2). That is to say, the transfer control unit 26 control the V driver 23 in order to output the vertical transfer clocks $\phi_{V1}$, $\phi_{V2}$, and $\phi_{V3}$ having a frequency higher than the normal frequency at a timing reverse to the normal timing, and causes the charges obtained by the photoelectric converting unit 50 to be drained out via the vertical transfer unit 51 to the drain 52 (see FIG. 2).

Thereafter, the charges are accumulated in the image sensor 21 for 1/250 seconds (step A3). In this step, the transfer control unit 26 counts the exposure time based upon the data which has been stored in the exposure time data memory unit 25, and starts to control both the H driver 22 and V driver 23 after this exposure time has passed in order that the image signal is output from the image sensor 21.

It should be noted that the transfer control unit 26 controls both the H driver 22 and V driver 23 in accordance with the control data which has been previously supplied from the control unit 24 and corresponds to the display position of the designation frame 42. This designation frame 42 is being displayed on the liquid crystal display unit 41.

For instance, in case that the designation frame 42 is being displayed at the position indicated by a solid line shown in FIG. 6, the charges of the photoelectric converting unit 50 corresponding to the portion of the photographing area "L" represented in FIG. 6 are drained out at a high speed (step A4).

The transfer control unit 26 controls the charges of the photoelectric converting unit 50 corresponding to the portion of the photographing area "M" which contains the portion corresponding to the subject designated by the designation frame 42 in such a manner that the V driver 23 and H driver 22 perform the normal drive operation, whereby these charges are output to the image signal processing unit 27 (step A5). In addition, the transfer control unit 26 sweeps out the charges of the photoelectric converting unit 50 corresponding to the remaining photographing region "N" to the drain 52 in the similar manner (step A6).

Figure 8:
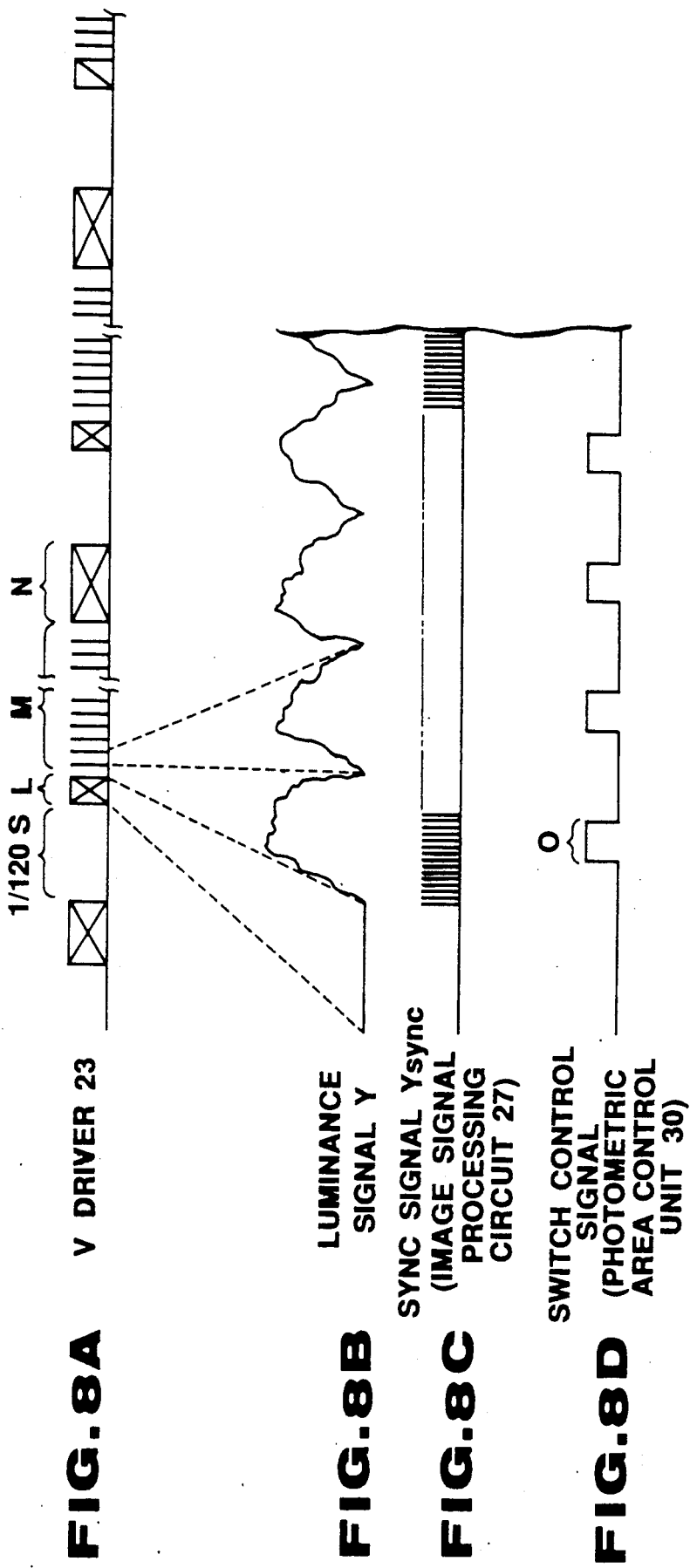
FIGS. 8A to 8D are timing charts for representing output conditions of signals derived from the major circuit portions of the electronic still camera while obtaining the luminance signal of the designated exposure-measuring area.

It should be noted that the time chart of the V driver 23 is represented in FIG. 8A.

As previously described, only the image signal corresponding to the photographing region "B" is output to the image signal processing circuit 27.

Then, in this image signal processing circuit 27, the luminance signal "Y" is produced from the image signal and supplied to the switching circuit 29. The sync signal Ysync corresponding to the output of this luminance signal "Y" is furnished to the photometric area control unit 30 (see FIGS. 8B and 8C).

It should be understood that the sync signal Ysync supplied from the image signal processing unit 27 to the photometric area control unit 30 is a signal formed in response to the clock output from the H driver 22.

It should be noted that although the clock output from the V driver 23 is completely synchronized with the output of the luminance signal Y in the time charts shown in FIGS. 8A and 8B, for the sake of simplicity, such a synchronization between the luminance signal and the clock signal does not occur in the actual case because there is a time shift in order to employ the image signal which has been delayed for 1 horizontal scanning period while producing the luminance signal Y.

On the other hand, when the first release signal S1 is outputted from the release switch 38, the photometric area control unit 30 causes the pixel position data memory units 92 and 93 to store the head pixel position data and last pixel position data supplied from the control unit 24, respectively (see FIG. 4). It should be noted that the above-described head pixel position data and last pixel position data represent positions of the pixels corresponding to both end portions of the designation frame 42 in the horizontal direction. Then, the pixel position data which have been stored in the head pixel position data memory unit 92 are supplied via the gate circuit 94 to the coincidence detecting circuit 91. The sync signal Ysync outputted from the image signal processing unit 27 is supplied to the counter 90 for the counting purpose. The count value of this counter 90 is continuously supplied to the coincidence detecting circuit 91. The coincidence detecting circuit 91 judges a coincidence between the pixel position data supplied from the head pixel position data memory unit 92 and the count value from the counter 90, and supplies a coincidence signal when the coincidence is established therebetween. The coincidence signal outputted from the coincidence circuit 91 sets the flip-flop 97 via the AND gate 96, so that the switching circuit 27 is brought into the ON-state and also the gate circuit 94 is turned OFF as well as the gate circuit 95 is turned ON.

Then, the pixel position data which have been stored in the last pixel position data memory unit 93 is supplied to the coincidence circuit 91, and the above-described coincidence comparison process of the count value of the counter 90 is carried out therein.

Thereafter, when the count value of the counter 90 is coincident with the pixel position data which have been stored in the last pixel position data memory unit 93, which is detected by the coincidence detecting circuit 91, the coincidence detecting circuit 91 again outputs the coincidence signal. The coincidence signal outputted from the coincidence detecting circuit 91 causes the flip-flop 97 via the AND gate 98 to be reset, the switch circuit 29 to be turned OFF, and the AND gate 95 to be turned OFF, and also the AND gate 94 to be turned ON. Then, the pixel position data which have been stored in the head pixel position data memory unit 92 is again supplied to the coincidence detecting circuit 91. When all of the sync signals Ysync during 1 horizontal scanning period have been outputted, the counter 90 outputs the carry signal, whereby the counted value is reset in response to this carry signal.

As previously described, the photometric area control unit 30 causes the switching circuit 29 to be in the ON-state in response to the pixel position data D which has been previously supplied from the control unit 24, and also the sync signal Ysync furnished from the image signal processing circuit 27 at a timing when the luminance signal Y corresponding to a photographing area "0" shown in FIG. 6 is output from the image signal processing circuit 27 (see FIG. 8D).

As previously explained, only the luminance signal "Y" corresponding to the subject which has been designated via the switching circuit 29 by the designation frame 42, is supplied to the automatic focusing control unit 32.

The automatic focusing control unit 32 commences the on-focusing condition detecting operation in response to the luminance signal Y in synchronism with the transfer end signal supplied from the transfer control unit 26. When the off-focusing condition is detected, the automatic focusing control unit 32 outputs the control signal to the motor control unit 18 so as to move the lens 14 along the proper direction. In this case, the transfer control unit 26 repeats the processes defined at the steps A2 to A7.

When, on the other hand, the on-focusing condition is detected by the automatic focusing control unit 32, an automatic focusing control end signal is output to the control unit 24 by the automatic focusing control unit 32.

Thereafter, once this automatic focusing control end signal is supplied to the control unit 24, the automatic exposure control process is commenced.

When the spot photometric mode is designated by operating the mode switch 37, the luminance signal Y is supplied to the automatic exposure control unit 31 under the control similar to that of the above-described automatic focusing control process.

To the contrary, when the entire photometric mode is designated by operating the mode switch 37, the control unit 24 furnishes new control data to both the photometric area control unit 30 and transfer control unit 26 in order that the luminance signal Y corresponding to all of the image signals obtained from the image sensor 21 is supplied to the automatic exposure control unit 31.

Then, the luminance signal Y supplied to the automatic exposure control unit 31 under the either control is furnished to the A/D converting unit 61 of this automatic exposure control unit 31.

In the A/D converting unit 61, the above-described luminance signal "Y" is sampled based upon the sync signal Ysync supplied from the image signal processing circuit 27 so as to obtain digital data. This digital data is output from this A/D converting unit 61 to the high speed adding circuit 62.

The added data obtained from the high speed adding circuit 62 is fetched by the diaphragm/exposure time converting unit 63 in synchronism with the transfer end signal output from the transfer control unit 26.

It should be noted that the control data corresponding to the designated entire photometric mode or spot photometric mode is supplied from the control unit 24 to the diaphragm/exposure time converting unit 63.

In the diaphragm/exposure time converting unit 63, both proper exposure time data and proper diaphragm open degree data are obtained based upon the above-described added data, control data, and furthermore distance data output from the automatic focusing control unit 32, and are supplied to the exposure time data memory unit 25 and motor control unit 20, respectively.

The motor control unit 20 drives the diaphragm drive motor 19 in response to the diaphragm open degree data so as to set the proper open degree of the diaphragm 16.

When the above-described automatic exposure control process is accomplished, the automatic exposure control unit 31 outputs the automatic exposure control end signal to the control unit 24.

When the second release signal $S_2$ is output from the release switch 38 after the above-described exposure control process is completed (in case that the second release signal $S_2$ has been output, at the same time when the exposure control process is completed), the control unit 24 outputs such a control signal that the normal image signal is obtained at the transfer control unit 26, and also outputs to the image data memory unit 33 another control data F for designating the memory operation. In other words, after the transfer control unit 26 clears the charges of the image sensor 21, this control unit 26 counts the time based upon the exposure time data which has been stored in the exposure time data memory unit 25. Then, the transfer control unit 26 sequentially outputs the charges accumulated in the image sensor 21 after the time determined by the above-described exposure time data has passed.

Subsequently, the image signal output from the image sensor 21 is supplied to the image signal processing circuit 27 so as to be converted into the luminance/sync signal (Y+S) and color difference signals (R−Y), (B−Y).

The luminance/sync signal (Y+S) and color difference signals (R−Y) and (B−Y) are then supplied to the image data memory unit 33 and recorded as single still image data in the image data memory unit 33.

When the image data recorded in the image data memory unit 33 is reproduced, the output mode is set by the mode switch 37 and the release switch 38 is operated.

Once the second release signal $S_2$ is output from the release switch 38, the control unit 24 outputs the control data F and G to both the image data memory unit 33 and stored image signal processing unit 34.

Then, the image data memory unit 33 repeatedly supplies the image data corresponding to a single still image which has been recorded in the image data memory unit 33, to the stored image signal processing unit 34. The function of this stored image signal processing unit 34 is to produce an NTSC color TV signal from the image data supplied from the image data memory unit 33, and delivers the NTSC color TV signal to the image signal output terminal 35.

Furthermore, when the release switch 38 is operated, the control unit 24 instructs the image data memory unit 33 such that image data with respect to a next still image is output. As stated above, the control unit 24 sequentially updates the output still image every time the release switch 38 is operated.

SECOND AUTOMATIC EXPOSURE CONTROL UNIT

Figure 9:
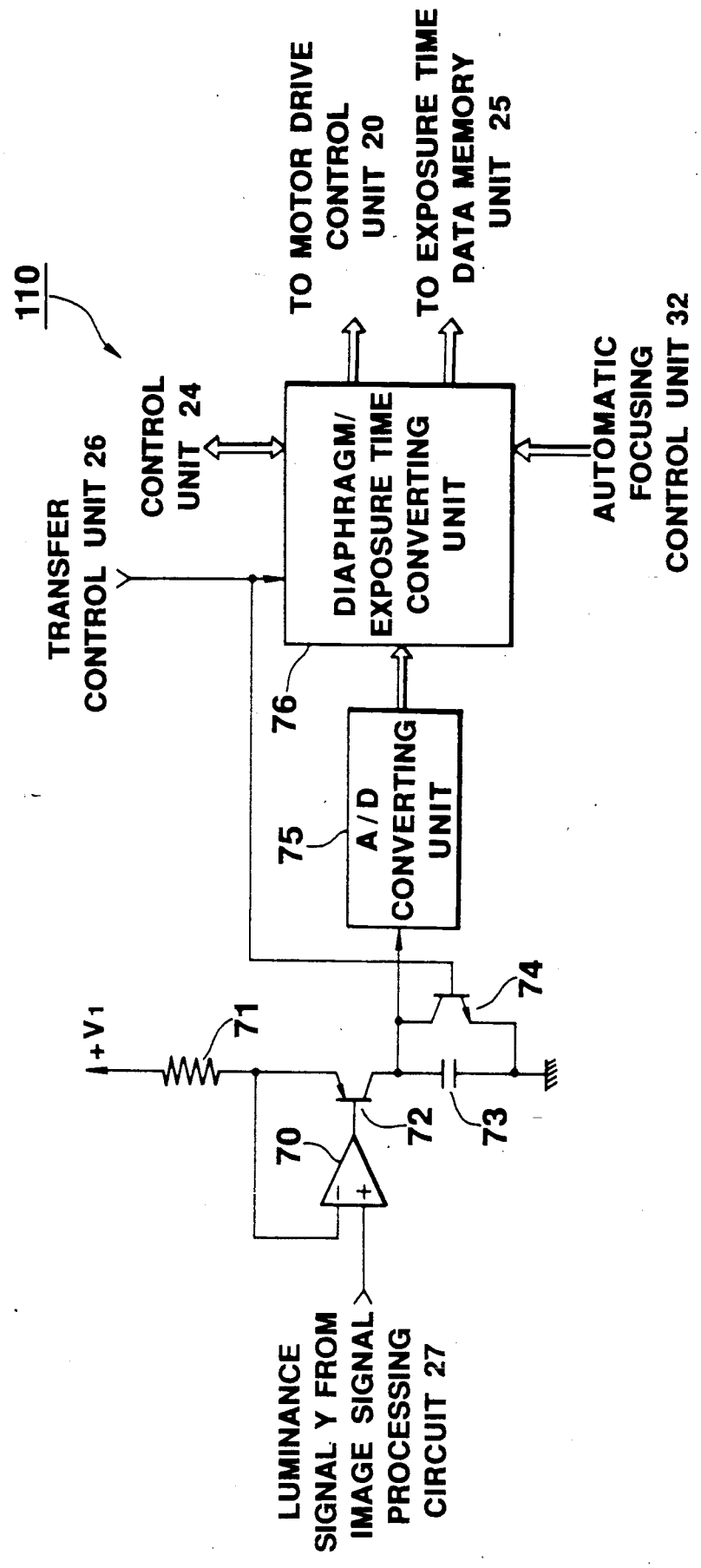
FIG. 9 is a schematic block diagram of an automatic exposure control unit shown in FIG. 2 according to a second preferred embodiment of the present invention.

Referring to FIG. 9, an automatic exposure control unit according to a second preferred embodiment will now be described.

First, the luminance signal Y which is derived from the image signal processing circuit 27 via the switching circuit 29 to the second automatic exposure control unit 110, is input into an operational amplifier 70. A voltage $V_1$ is applied via a resistor 71 to one terminal (i.e., minus terminal) of the operational amplifier 70. An output from the operational amplifier 70 is input to a base electrode a PNP transistor 72. The voltage $V_1$ is applied via the resistor 71 to an emitter of this PNP transistor 72. A collector of the transistor 72 is connected to a capacitor 73. Both terminals of this capacitor 72 are connected between an emitter and a collector of an NPN transistor 74. One junction between one terminal of the capacitor 73 and the emitter of the NPN transistor 74 is grounded, whereas the other junction between the other terminal of the capacitor 73 and the collector thereof is connected to an A/D converting unit 75. A transfer end signal output from the transfer control unit 26 is supplied to a base electrode of this NPN transistor 74.

The above-described operational amplifier 70, resistor 71, PNP transistor 72, capacitor 73 and NPN transistor 74 charge the charges corresponding to the luminance signal Y which has been supplied via the switching circuit 29 into the capacitor 73, and discharge the charges from the capacitor 73 when the transfer end signal is output from the transfer control unit 26.

That is, at the plus terminal of this capacitor 73, a voltage is produced which is proportional to a sum of the charges accumulated in the respective photoelectric converting units 50 of the image sensor 21 corresponding to the range designated by the photometric area designation unit 36.

The function of the A/D converting unit 75 is to obtain digital data corresponding to the voltage value appearing at the plus terminal of the capacitor 73. This digital data is supplied to a diaphragm/exposure time converting unit 76.

It should be noted that since the arrangement of this diaphragm/exposure time converting unit 76 is substantially identical to that of the above-described diaphragm/exposure time converting unit 76 represented in FIG. 3, no further explanation thereof is made in the specification.

In accordance with the second automatic exposure control unit 110 with the above-described arrangement, in response to the luminance signal Y output from the image signal processing circuit 27 via the switching circuit 29, the voltage proportional to the sum of the luminance of the pixels which have been designated by the photometric area designation unit 36 is produced at the plus terminal of the capacitor 73. Then, the produced voltage is A/D-converted by the A/D converting unit 75 into the corresponding digital data, both the proper exposure time and proper diaphragm open degree are obtained.

THIRD AUTOMATIC EXPOSURE CONTROL UNIT

Figure 10:
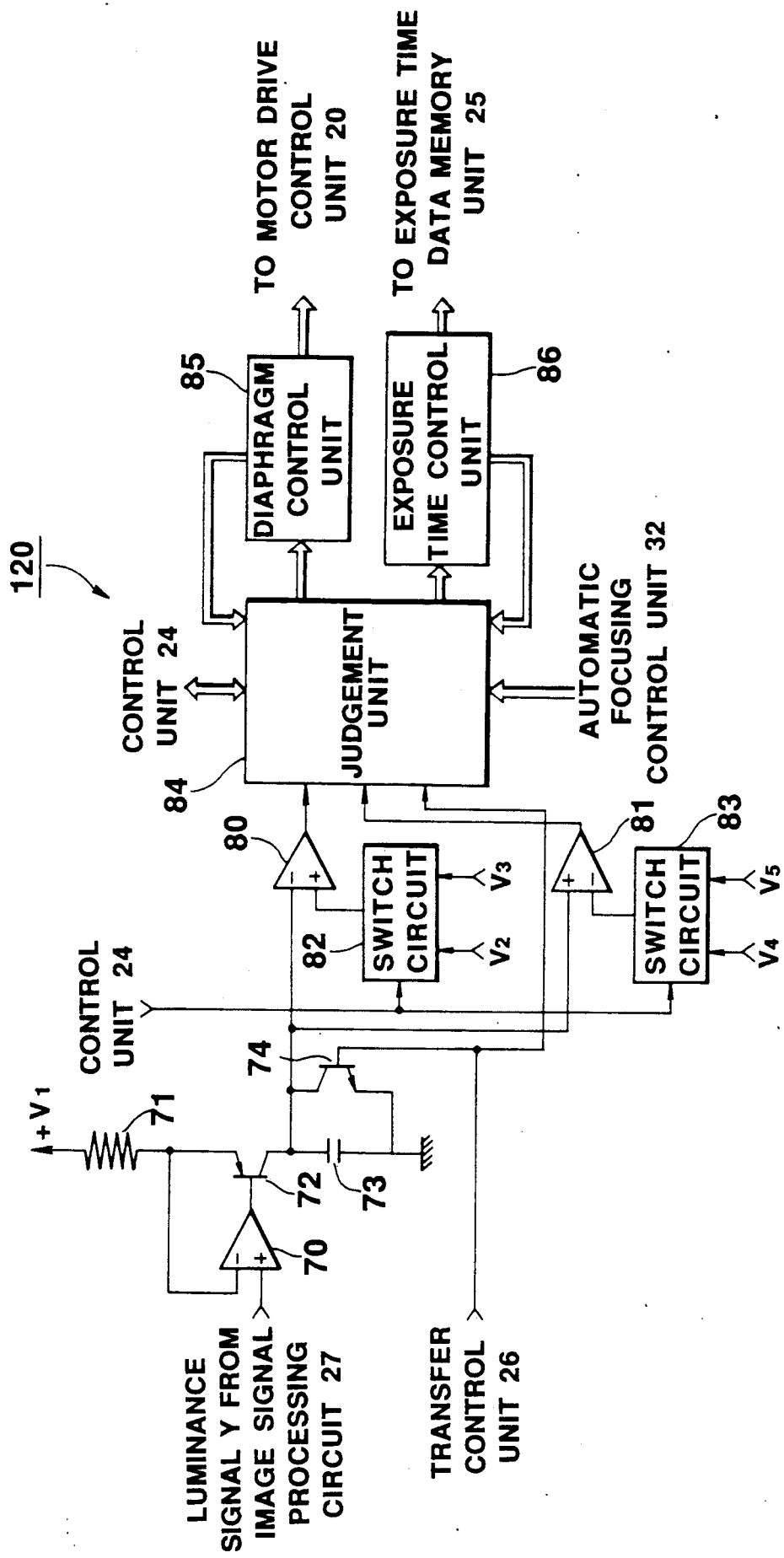
FIG. 10 is a schematic block diagram of an automatic exposure control unit shown in FIG. 2 according to a third preferred embodiment of the present invention; and, FIGS. 11A to 11D are timing charts for representing output conditions of signals derived from the major circuit portions of the electronic still camera while performing the exposure control in the automatic exposure control unit shown in FIG. 10.

In FIG. 10, there is shown another arrangement of an automatic exposure control unit according to a third preferred embodiment of the invention.

It should be noted that the same reference numerals shown in FIG. 9 will be employed for indicating the same or similar circuit elements shown in FIG. 10, and no further explanation thereof is made.

Similar to the above-described second automatic exposure control unit 110, a operational amplifier 70, a resistor 71, a PNP transistor 72, a capacitor 73 and an NPN transistor 74 constitute such an arrangement that charges proportional to luminance of the respective pixels in an image which has been designated by the photometric area designation unit 36, are charged into the capacitor 73.

A plus terminal of the capacitor 73 is connected to a minus terminal of a first comparator 80 and also a plus terminal of a second comparator 81.

On the other hand, to a plus terminal of this first comparator 80, either a voltage $V_2$, or $V_3$ is applied via a switch circuit 82.

The function of the switch circuit 82 is to select the voltage $V_2$, or $V_3$ in response to the designated photometric mode (i.e., spot photometric mode, entire photometric mode) based upon the control signal output from the control unit 24. That is, the voltage $V_2$ is set to be greater than $V_3$, and a selection is made that the voltage $V_3$ is set when the spot photometric mode is designated, and the voltage $V_2$ is set when the entire photometric mode is designated.

Either a voltage $V_4$, or $V_5$ is applied via a switch circuit 83 to a minus terminal of the second comparator 81.

The function of this switch circuit 83 is similar to that of the switch circuit 82. That is, when the proper photometric mode is designated, the voltage $V_4$ or $V_5$ is selected in response to the control signal output from the control unit 24. In other words, the voltage $V_4$ is set to be greater than the voltage $V_5$. The first voltage $V_4$ is selected when the spot photometric mode is designated, whereas the second voltage $V_5$ is selected when the entire photometric mode is selected.

Also, the voltage $V_4$ is selected to be larger than the voltage $V_2$, whereas the voltage $V_5$ is selected to be greater than the voltage $V_3$.

The outputs from the first and second comparators 80 and 81 are supplied to a judgment unit 84. This judgment unit 84 is to output control signals to a diaphragm control unit 85 and an exposure time control unit 86 in response to the outputs derived from the first and second comparators 80 and 81, control unit 24, and automatic focusing control unit 22.

In other words, when the first and second comparators 80 and 81 output both "High" signals, the judgment unit 84 judges that the measured exposure is over the proper value. To the contrary, when "Low" signals are output from the first and second comparators 80 and 81, the judgment unit 84 judges that the measured exposure is under the proper value.

Based upon the judgment results (i.e., under exposure and over exposure), the judgment unit 84 outputs the control signals to the diaphragm control unit 85 and exposure time control unit 86. At this time, the judgment unit 84 obtains both diagram open degree information and exposure time information which have been set by the exposure control unit 85 and exposure time control unit 86, and also obtains information on a distance from the camera to the subject from the automatic focusing control unit 32. As a result, the judgment unit 84 outputs the control signals to the diaphragm control unit 85 and exposure time control unit 86 in such a manner that the proper open degree is combined with the proper exposure time.

Then, the diaphragm control unit 85 outputs the control signal to the motor control unit 20 in response to the control signal supplied from the judgment unit 84.

On the other hand, the exposure time control unit 86 obtains the exposure time data based upon the control signal supplied from the judgment unit 84, and supplies this data to the exposure time data memory unit 25.

AUTOMATIC EXPOSURE CONTROL

Automatic exposure control operations of the automatic exposure control unit 120 with the above-described arrangements will now be described.

In FIGS. 11A to 11D, there are shown time charts for representing output conditions of this automatic exposure control unit 120.

First, the luminance signal Y which has been supplied via the switch circuit 29 from the image signal processing unit 27, is furnished via the operational amplifier 70 to the PNP transistor 72, so that the charges corresponding to the voltage value of this luminance signal "Y" are charged into the capacitor 73, and therefore the voltage corresponding to the charges appears at the plus terminal of the capacitor 73 (see FIG. 9B).

On the other hand, both the first and second comparators 80 and 81 output the signal corresponding to the voltage value appearing at the plus terminal of the capacitor 73, to the judgment unit 84.

In other words, the first comparator 80 outputs the "High" level signal when the voltage appearing at the plus terminal of the capacitor 73 exceeds the voltage $V_2$ or $V_3$ (see FIG. 11D). The second comparator 81 outputs the "High" level signal when the voltage appearing at the plus terminal of the capacitor 73 exceeds the voltage $V_4$ or $V_5$ (see FIG. 11C).

When both the outputs from the first and second comparators 80 and 81 become high levels, the judgment unit 84 judges that the measured exposure is over the proper exposure value so that the diaphragm 16 is closed, or the exposure time is shortened, or both controls are carried out. These controls are performed by sending the control signal to either the exposure control unit 81, or exposure time control unit 86, otherwise both control units 85 and 86.

To the contrary, when both the outputs from the first and second comparators 80 and 81 become low levels, the judgment unit 84 judges that the measure exposure is under the proper exposure value. Under this judgment, the judgment unit 84 transfers the control signal to either the diaphragm control unit 85, or the exposure time control unit 86, otherwise both control units 85 and 86, whereby either the diaphragm is opened, or the exposure time is prolonged.

Furthermore, when the high level signal is derived from only the first comparator 80, the judgment unit 84 judges that the measured exposure is proper, and then outputs the automatic exposure process end signal to the control unit 24.

What is claimed is

1. A camera apparatus comprising:
    optical image forming means for forming an optical image;
    image sensing means having a photoelectric converting area comprised of a plurality of frame areas, for producing electric signals in response to said optical image formed by said optical image forming means;
    area designating means for designating a desired frame area from said plurality of frame area;
    selecting means for selecting from the electric signals produced by the whole electric converting area, electric signals produced by said desired frame area designated by said area designated means; and,
    producing means for producing a video signal based on said electric signals produced by said image sensing means and said selecting means.

2. The camera apparatus of claim 1, further comprising:
    on-focusing detecting means for detecting whether or not said optical image formed by said optical image forming means is just focused on said image sensing means, based on said electric signals selected by said selecting means; and,
    focusing control means for controlling said optical image forming means based on an on-focusing detecting signal obtained by said on-focusing detecting means, so as to focus said optical image formed by said optical image forming means just on said image sensing means.

3. The camera apparatus of claim 1, further comprising:
    luminous energy determining means for determining a level of a luminous energy of said optical image formed by said optical image forming means, in response to said selected electric signals selected by said selecting means; and,
    luminous energy control means for controlling the level of the luminous energy of said optical image formed by said optical image forming means, based on a luminous energy determining signal obtained by said luminous energy determining means, so as to set a predetermined exposure condition.

4. The camera apparatus of claim 3, further comprising:
    diaphragm means for controlling the level of the luminous energy of said optical image; and,
    diaphragm control means for controlling said diaphragm means based on said luminous energy determining signal obtained by said luminous energy determining means, so as to set the predetermined exposure condition.

5. The camera apparatus of claim 4, further comprising:
    exposure means for exposing the optical image incident upon said image sensing means for enabling said image sensing means to produce said electric signals; and,
    exposure control means for controlling said exposure means, based on said luminous energy determining signal obtained by said luminous energy determining means.

6. The camera apparatus of claim 1, further comprising:
    on-focusing detecting means for detecting whether or not said optical image formed by said optical image forming means is just focused on said image sensing means, based on said electric signals selected by said selecting means;
    focusing control means for controlling said optical image forming means based on an on-focusing detecting means obtained by said on-focus detecting means, so as to focus said optical image formed by said optical image forming means just on said image sensing means;
    luminous energy determining means for determining a level of a luminous energy of said optical image formed by said optical image forming means, in response to said selected electric signals selected by said selecting means; and,
    luminous energy control means for controlling the level of said luminous energy of said optical image formed by said optical image forming means, in response to a determining signal obtained by said determining means, so as to set a predetermined exposure condition.

7. The camera apparatus of claim 1, further comprising:
    viewfinder means for displaying a subject to be formed into said optical image by said optical image forming means and for indicating a part of said subject to be formed into said optical image corresponding to said photoelectric converting area designated by said area designating means.

8. The camera apparatus of claim 7, wherein said viewfinder means includes display means for indicating said part of said subject to be formed into said optical image corresponding to said photoelectric converting area designated by said area designating means.

9. The camera apparatus of claim 8, wherein said display means includes a liquid-crystal display device.

10. A method of operating a camera apparatus constructed of image sensing means having a photoelectric converting area comprised of a plurality of frame area, the method comprising the steps of:
    forming an optical image;
    producing first electric signals in response to said optical image;
    designating a desired frame area from said plurality of frame area;
    selecting second electric signals produced from said designated desired frame area from the first electric signals;
    producing a video signal based on said second electric signals produced by said image sensing means.

11. The method of claim 10, further comprising the steps of:
    detecting whether or not said optical image is just focused on said image sensing means, based on said selected second electric signals; and,
    controlling said optical image based on an on-focusing detecting signal obtained by said detecting step, so as to focus said optical image just on said image sensing means.

12. The method of claim 10, further comprising the steps of:
   determining a level of a luminous energy of said optical image, based on said selected second electric signals; and,
   controlling said optical image based on a luminous energy level determining signal obtained by said determining step, so as to set a predetermined exposure condition.

13. The method of claim 10, further comprising the steps of:

focus-detecting whether or not said optical image is just focused on said image sensing means, based on said selected second electric signal;
controlling said optical image based on an on-focusing detecting signal obtained by said focus-detecting step, so as to focus said optical image just on said image sensing means;
luminous-determining a level of a luminous energy of said optical image, based on said selected second electric signals; and,
controlling said optical image based on a luminous energy detecting signal obtained by said luminous-detecting step, so as to set a predetermined exposure condition.

* * * * *

UNITED STATES PATENT AND TRADEMARK OFFICE
CERTIFICATE OF CORRECTION

PATENT NO. : 5,051,833
DATED : September 24, 1991
INVENTOR(S) : A. TSUJI

It is certified that error appears in the above-identified patent and that said Letters Patent is hereby corrected as shown below:

Column 18, line 30 (claim 6), before "determining", insert --luminous energy--.

Column 18, line 31 (claim 6), before "determining", insert --luminous energy--.

Signed and Sealed this

Twenty-seventh Day of April, 1993

Attest:

MICHAEL K. KIRK

*Attesting Officer*    Acting Commissioner of Patents and Trademarks